(12) United States Patent
Takahata

(10) Patent No.: US 10,992,083 B2
(45) Date of Patent: Apr. 27, 2021

(54) COMMUNICATION HARNESS, COMMUNICATION HARNESS SET, AND RELAY CONNECTOR

(71) Applicant: Panasonic Intellectual Property Management Co., Ltd., Osaka (JP)

(72) Inventor: Atsushi Takahata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/730,986

(22) Filed: Dec. 30, 2019

(65) Prior Publication Data

US 2020/0136318 A1 Apr. 30, 2020

Related U.S. Application Data

(63) Continuation of application No. PCT/JP2018/025739, filed on Jul. 6, 2018.

(30) Foreign Application Priority Data

Oct. 10, 2017 (JP) .............................. JP2017-196537

(51) Int. Cl.
*H01R 13/6474* (2011.01)
*H01B 11/12* (2006.01)
(Continued)

(52) U.S. Cl.
CPC ......... *H01R 13/6474* (2013.01); *H01B 11/12* (2013.01); *H01R 13/6471* (2013.01);
(Continued)

(58) Field of Classification Search
CPC ............ H01R 13/6474; H01R 13/6471; H01R 13/6592; H01R 13/65912;
(Continued)

(56) References Cited

U.S. PATENT DOCUMENTS

2001/0027041 A1 10/2001 Naito et al.
2002/0039857 A1 4/2002 Naito et al.
(Continued)

FOREIGN PATENT DOCUMENTS

JP   2001-345151   12/2001
JP   2006-066203   3/2006
(Continued)

OTHER PUBLICATIONS

International Search Report of PCT application No. PCT/JP2018/025739 dated Sep. 25, 2018.
(Continued)

*Primary Examiner* — Abdullah A Riyami
*Assistant Examiner* — Justin M Kratt
(74) *Attorney, Agent, or Firm* — Greenblum & Bernstein, P.L.C.

(57) ABSTRACT

A communication harness is used for mutual data transmission by differential transmission between at least two electronic devices. The communication harness includes a cable, a first signal line, a second signal line, and a first ground line. The first signal line is surrounded by the cable and transmits a first signal for differential transmission. The second signal line is surrounded by the cable and transmits a second signal for differential transmission. The first ground line is surrounded by the cable. A supply voltage is superposed on the first signal line.

3 Claims, 7 Drawing Sheets

(51) Int. Cl.
*H01R 13/6471* (2011.01)
*H01R 13/6591* (2011.01)
*H01R 13/6461* (2011.01)
*H04L 25/49* (2006.01)
*H01R 24/40* (2011.01)
*H04B 3/30* (2006.01)
*H01R 13/6592* (2011.01)
*H04B 3/56* (2006.01)
*H04B 3/54* (2006.01)
*H01R 24/64* (2011.01)
*H01R 12/75* (2011.01)
*H01R 12/77* (2011.01)
*H01R 13/652* (2006.01)
*H04L 25/02* (2006.01)
*H01R 31/06* (2006.01)

(52) U.S. Cl.
CPC ............ *H01R 12/75* (2013.01); *H01R 12/775* (2013.01); *H01R 13/6461* (2013.01); *H01R 13/652* (2013.01); *H01R 13/6592* (2013.01); *H01R 13/65912* (2020.08); *H01R 13/65914* (2020.08); *H01R 13/65915* (2020.08); *H01R 24/40* (2013.01); *H01R 24/64* (2013.01); *H01R 31/06* (2013.01); *H04B 3/30* (2013.01); *H04B 3/54* (2013.01); *H04B 3/56* (2013.01); *H04B 2203/5416* (2013.01); *H04B 2203/5425* (2013.01); *H04B 2203/5483* (2013.01); *H04L 25/0272* (2013.01); *H04L 25/4917* (2013.01)

(58) Field of Classification Search
CPC ............ H01R 13/65915; H01R 12/775; H01R 13/65914; H01R 24/64; H01R 13/6461; H01R 24/40; H01R 31/06; H01R 13/652; H01R 12/75; H01B 11/12; H04B 3/30; H04B 2203/5425; H04B 2203/5483; H04B 2203/5416; H04B 3/56; H04B 3/54; H04L 25/4917; H04L 25/0272
USPC .................................. 439/98, 607.41–607.52
See application file for complete search history.

(56) References Cited

U.S. PATENT DOCUMENTS

2007/0087632 A1* 4/2007 Fong .................. H01B 11/1066
439/607.41
2010/0307811 A1* 12/2010 Griffin ................... H01B 11/12
174/350

FOREIGN PATENT DOCUMENTS

| JP | 2006066203 A | * | 3/2006 | |
|----|--------------|---|--------|---|
| JP | 2011-192597 | | 9/2011 | |
| JP | 2014-038708 | | 2/2014 | |
| JP | 5857911 B | | 2/2016 | |
| WO | WO-2012127648 A1 | * | 9/2012 | .............. B60L 50/40 |

OTHER PUBLICATIONS

Notice of Reasons for Refusal in Japan dated Nov. 10, 2020 for Japanese Patent Application No. 2017-196537.

* cited by examiner

FIG. 1A
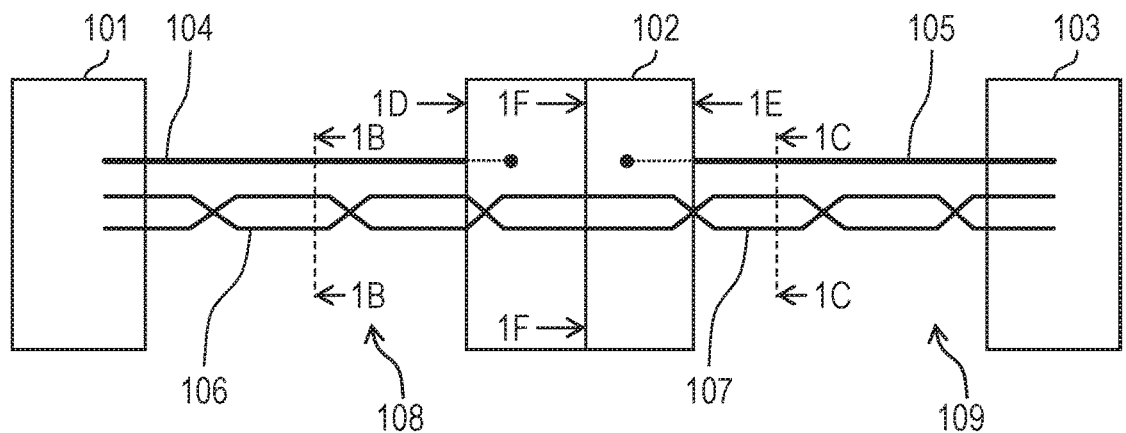
FIG. 1B
FIG. 1C
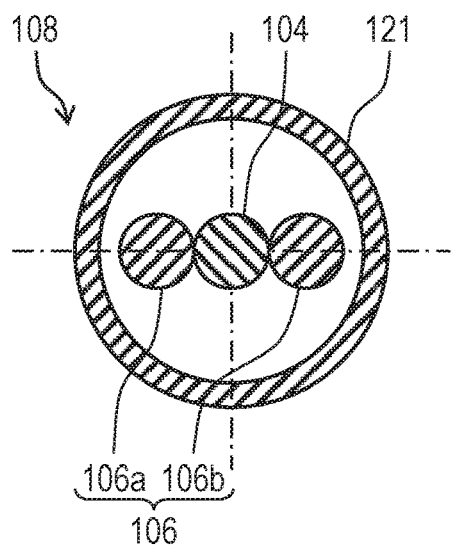
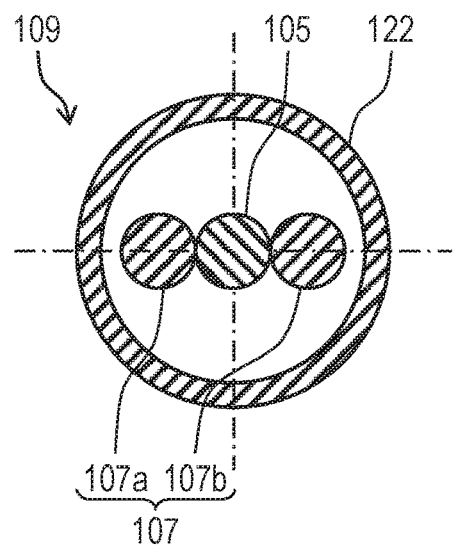
FIG. 1D
FIG. 1E
FIG. 1F
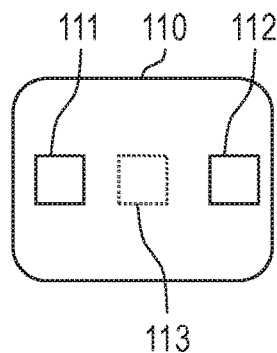
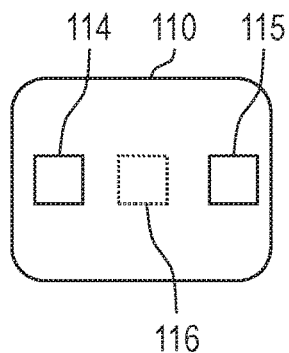
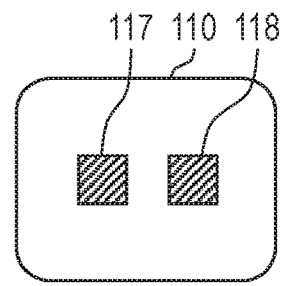

COMMUNICATION HARNESS, COMMUNICATION HARNESS SET, AND RELAY CONNECTOR

CROSS-REFERENCE TO RELATED APPLICATIONS

This application is a continuation of the PCT International Application No. PCT/JP2018/025739 filed on Jul. 6, 2018, which claims the benefit of foreign priority of Japanese patent application No. 2017-196537 filed on Oct. 10, 2017, the contents all of which are incorporated herein by reference.

BACKGROUND

1. Technical Field

The present disclosure relates to a communication harness, a communication harness set, and a relay connector.

2. Description of the Related Art

For example, in communication such as in-vehicle Ethernet (registered trademark), in order to reduce the cost of the cables, the method of performing communication by multi-level transmission (MLT) is being shifted to pulse-amplitude modulation (PAM) communication. In PAM communication, differential transmission is used where twisted pair cables are used. In order to reduce the cost of the cables more, a technique is used in which a power supply is superposed on a differential transmission signal.

For example, Japanese Patent Publication No. 5857911 discloses a communication harness between devices using in-vehicle Ethernet (registered trademark).

SUMMARY

The present disclosure provides a communication harness, a communication harness set, and a relay connector capable of achieving both electromagnetic compatibility (EMC) resistance and power supply superposition function of a pair cable in communication between electronic devices.

A communication harness according to one aspect of the present disclosure is a communication harness used for mutual data transmission by differential transmission between at least two electronic devices. The communication harness includes a cable, a first signal line, a second signal line, and a ground line. The first signal line is covered with a cable and transmits a first signal for differential transmission. The second signal line is covered with the cable, and transmits a second signal for differential transmission. The ground line is covered with the cable. A supply voltage is superposed on the first signal line. A communication harness set according to one aspect of the present disclosure is used for mutual data transmission via a relay connector by differential transmission between at least two electronic devices. The communication harness set includes a communication harness and a second communication harness. Each of the first communication harness and the second communication harness includes: a cable; a first signal line which is covered with the cable, and through which a first signal for differential transmission is transmitted; a second signal line which is covered with the cable, and through which a second signal for differential transmission is transmitted; and a ground line covered with the cable. A supply voltage is superposed on the first signal line of each of the first communication harness and the second communication harness. The first signal line of the first communication harness is electrically connected to the first signal line of the second communication harness via the relay connector, and the second signal line of the first communication harness is electrically connected to the second signal line of the second communication harness via the relay connector. The ground line of the first communication harness is electrically isolated from the ground line of the second communication harness by the relay connector.

A relay connector according to one aspect of the present disclosure is disposed between a first electronic device and a second electronic device, and relays a signal for differential transmission. The relay connector has a first terminal, a second terminal, a third terminal, a fourth terminal, a fifth terminal, a sixth terminal, a first conductive portion, and a second conductive portion. The first terminal is configured to be connected to a first signal line included in a first communication harness connected to the first electronic device. The second terminal is configured to be connected to a second signal line included in the first communication harness. The third terminal is configured to be connected to a ground line included in the first communication harness. The fourth terminal is configured to be connected to a first signal line included in a second communication harness connected to the second electronic device. The fifth terminal is configured to be connected to a second signal line included in the second communication harness. The sixth terminal is configured to be connected to a ground line included in the second communication harness. The first conductive portion is electrically conductive to the first terminal and the fourth terminal, and the second conductive portion is electrically conductive to the second terminal and the fifth terminal. The third terminal and the sixth terminal are electrically isolated from each other.

The communication harness according to the aspect of the present disclosure is capable of improving EMC resistance by arranging the ground line. Moreover, since a supply voltage is superposed on the first signal line, power supply superposition function is realized. Therefore, it is possible to achieve both the EMC resistance and the power supply superposition function of a pair cable in communication between the electronic devices. Additionally, the cable strength at the time of pair cable signal wiring can be improved by arranging the ground line.

BRIEF DESCRIPTION OF DRAWINGS

FIG. 1A schematically illustrates an electrical connection relationship between communication harnesses according to a first exemplary embodiment, the communication harnesses connecting electronic devices.

FIG. 1B is a cross-sectional view taken along line 1B-1B in FIG. 1A.

FIG. 1C is a cross-sectional view taken along line 1C-1C in FIG. 1A.

FIG. 1D is a view as seen from arrow 1D in FIG. 1A.

FIG. 1E is a view as seen from arrow 1E in FIG. 1A.

FIG. 1F is a cross-sectional view taken along line 1F-1F in FIG. 1A.

DETAILED DESCRIPTION OF PREFERRED EMBODIMENTS

Figure 2A:
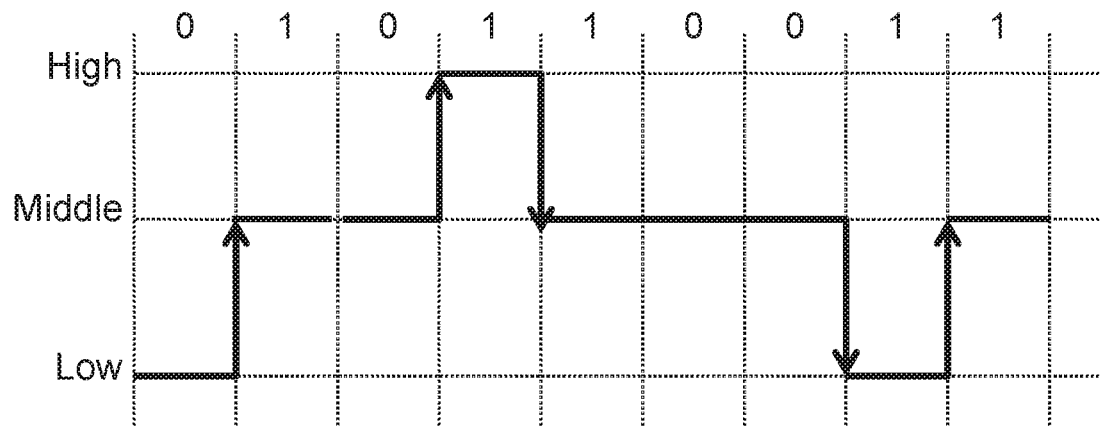
FIG. 2A illustrates an example of a voltage waveform in MLT communication as a data transmission method by Ethernet (registered trademark).

Hereinafter, various exemplary embodiments will be described with reference to the drawings. However, unnecessarily detailed descriptions may be omitted. For example, detailed description of already well-known matters and duplicative description of substantially the same configuration may be omitted. This is to avoid unnecessary redundancy of the following description and facilitate understanding by those skilled in the art.

Note that the accompanying drawings and following description are provided in order to facilitate sufficient understanding of the present disclosure by those skilled in the art, and as such, are not intended to limit the subject matter recited in the claims.

Prior to the description of the embodiments of the present disclosure, the story from the conventional technique to the present disclosure will be briefly described. It is desirable that twisted pair cable used for in-vehicle devices are inexpensive. More specifically, the manufacturing cost of unshielded twisted pair (UTP) cable is less than the manufacturing cost of shielded twisted pair (STP) cable.

However, since UTP cable do not have a shield function compared to STP cable, it is necessary to increase verification accuracy relative to noise for warranty of an in-vehicle device and to incorporate a noise control technique.

Moreover, the weight of the UTP cable can be reduced compared to the STP cable. In particular, with the electrification of vehicles, there is a demand for a technique which can reduce the weight and the number of harnesses that electrically connect internal electronic devices, ECUs (Engine Control Units), and the like.

In order to reduce the number of harnesses, there is a demand for a technique for superposing the functions of the harnesses, and there is a demand for a power supply superposition technique for superposing the power supply and data which is conventionally required to be routed in a separate system.

The present embodiment is conceived in view of such circumstances, and provides a communication harness which achieves both EMC resistance and power supply superposition function of a pair cable in communication between electronic devices.

EXEMPLARY EMBODIMENTS

First Exemplary Embodiment

Hereinafter, a first exemplary embodiment will be described with reference to FIG. 1A to FIG. 4

[1-1. Configuration of Communication Harness]

FIG. 1A schematically illustrates an electrical connection relationship between communication harnesses 108 and 109 according to the first exemplary embodiment, where communication harnesses 108 and 109 connects electronic devices. In FIG. 1A, first electronic device 101 as an example of the electronic devices and second electronic device 103 as another example of the electronic devices are connected to each other via twisted pair cables 106 and 107. Accordingly, first electronic device 101 and second electronic device 103 mutually transmit differential signals via twisted pair cables 106 and 107.

In communication, power supply superposition is performed. In addition to twisted pair cables 106 and 107, first ground lines (GND lines) 104 and 105 are disposed in the respective cables. Moreover, twisted pair cable 106 and twisted pair cable 107 are electrically connected to each other via relay connector 102, so that first electronic device 101 and second electronic device 103 are electrically connected to each other.

In relay connector 102, twisted pair cable 106 connected to first electronic device 101 and twisted pair cable 107 connected to second electronic device 103 are connected to each other. In contrast, first ground line 104 and first ground line 105 are not electrically connected to each other in relay connector 102. Alternatively, the impedance between the ground lines is higher than a reference impedance (so-called high impedance).

FIG. 1B is a cross-sectional view taken along line 1B-1B in FIG. 1A. Communication harness 108 includes hollow tubular cable 121, twisted pair cable 106, and first ground line 104. Twisted pair cable 106 and first ground line 104 are covered with cable 121. In order to transmit data, twisted pair cable 106 includes first signal line 106a and second signal line 106b which have mutually different polarities.

Since first signal line 106a and second signal line 106b transmit differential signals, the impedances of signals are designed to be the same. It is desirable that first ground line 104 according to the present embodiment is used as a ground line for fixing the ground potential, and that the capacitance between first signal line 106a and first ground line 104 is equal to the capacitance between second signal line 106b and first ground line 104. In the present embodiment, first ground line 104 is disposed between first signal line 106a and second signal line 106b, and the distance between first signal line 106a and first ground line 104 is substantially equal to the distance between second signal line 106b and first ground line 104. In the present embodiment, as an example, first signal line 106a and second signal line 106b are twisted, and first ground line 104 is disposed about halfway between first signal line 106a and second signal line 106b. In the present embodiment, "substantially equal" means that, of the two distances, the presentence of the difference between the two distances with respect to the shorter one is within 6%, inclusive, more preferably within 1%, inclusive.

FIG. 1C is a cross-sectional view taken along line 1C-1C in FIG. 1A. As illustrated in FIG. 1C, communication harness 109 includes hollow tubular cable 122, twisted pair cable 107, and first ground line 105, in a similar manner to communication harness 108. Twisted pair cable 107 and first ground line 105 are covered with cable 122. In order to transmit data, twisted pair cable 107 includes first signal line 107a and second signal line 107b which have mutually different polarities.

In a similar manner to the case of communication harness 108, since first signal line 107a and second signal line 107b transmit differential signals, the impedances of signals are designed to be the same. In the present embodiment, it is desirable that first ground line 105 is used as a ground line for fixing the ground potential, and that the capacitance between first signal line 107a and first ground line 105 is equal to the capacitance between second signal line 107b and first ground line 105. In the present embodiment, first ground line 105 is disposed between first signal line 107a and second signal line 107b. In the present embodiment, as an example, first signal line 107a and second signal line 107b are twisted, and first ground line 105 is disposed about halfway between first signal line 107a and second signal line 107b.

FIG. 1D is a view as seen from arrow 1D in FIG. 1A. FIG. 1D schematically illustrates relay connector 102 seen from first electronic device 101. Relay connector 102 includes housing 110, first terminal 111 to which first signal line 106a is to be connected, second terminal 112 to which second signal line 106b is to be connected, and third terminal 113 to which first ground line 104 is to be connected. Third terminal 113 is disposed between first terminal 111 and second terminal 112 according to the present embodiment.

FIG. 1E is a view as seen from arrow 1E in FIG. 1A. Relay connector 102 includes fourth terminal 114 to which first signal line 107a is to be connected, fifth terminal 115 to which second signal line 107b is to be connected, and sixth terminal 116 to which first ground line 105 is to be connected. Sixth terminal 116 is disposed between fourth terminal 114 and fifth terminal 115 according to the present embodiment.

FIG. 1F is a cross-sectional view taken along line 1F-1F in FIG. 1A. Relay connector 102 includes first conductive portion 117 electrically connected to first terminal 111 and fourth terminal 114, and second conductive portion 118 electrically connected to second terminal 112 and fifth terminal 115. Accordingly, first conductive portion 117 is electrically conductive to first signal line 106a and first signal line 107a, and second conductive portion 118 is electrically conductive to second signal line 106b and second signal line 107b.

In relay connector 102, third terminal 113 to which first ground line 104 is to be connected and sixth terminal 116 to which first ground line 105 is to be connected are not electrically conductive. As a result, the ends of first ground line 104 and first ground line 105 are merely fitted to relay connector 102, but are not electrically connected. Alternatively, an impedance between third terminal 113 (see FIG. 1D) and sixth terminal 116 (see FIG. 1E) to which first ground line 105 is to be connected may be higher than a reference impedance (so-called high impedance).

Figure 2B:
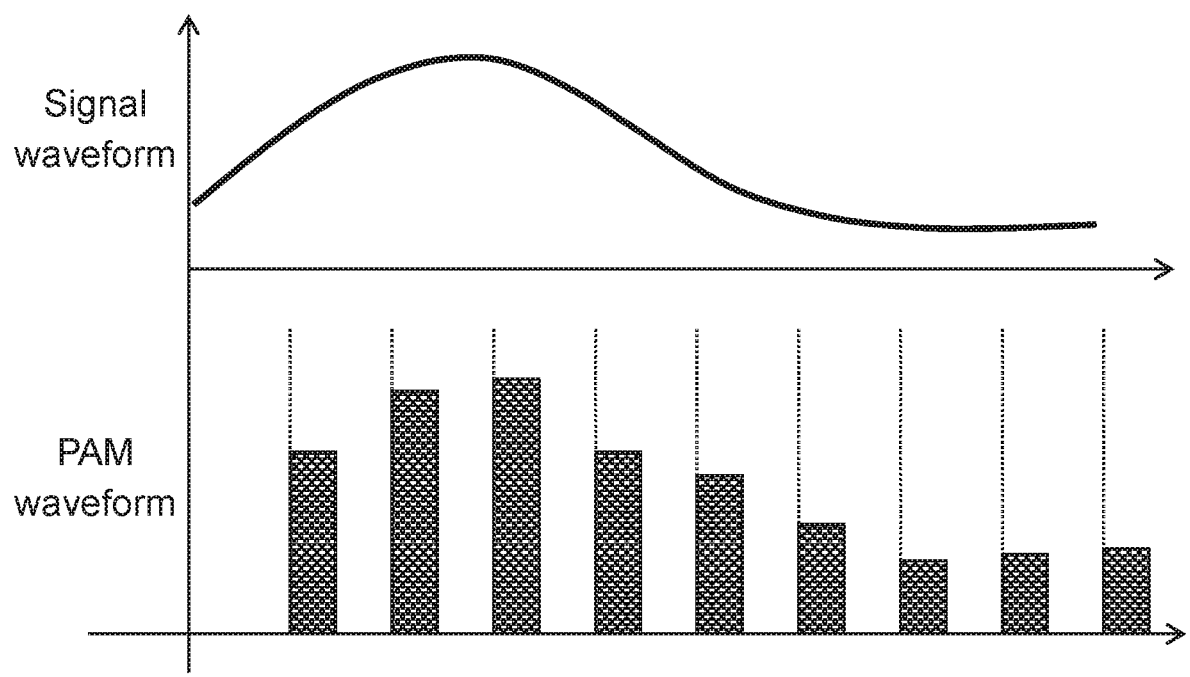
FIG. 2B illustrates an example of a voltage waveform in PAM communication as a data transmission method by Ethernet (registered trademark).

FIG. 2A and FIG. 2B schematically illustrate data transmission methods by Ethernet (registered trademark). FIG. 2A illustrates MLT communication and FIG. 2B illustrates PAM communication as the data transmission methods by Ethernet (registered trademark).

FIG. 2A illustrates an example of a voltage waveform in MLT communication. In MLT communication, data is identified by a change in voltage. Hence, the voltage essentially changes sharply, so that harmonic component noise is likely to be generated.

FIG. 2B illustrates an example of a voltage waveform in PAM communication. In the case of PAM communication, since data is transmitted based on a change in voltage amplitude, it tends to be susceptible to an external noise waveform. Therefore, in PAM communication, immunity testing tends to be more rigorous.

Figure 3A:
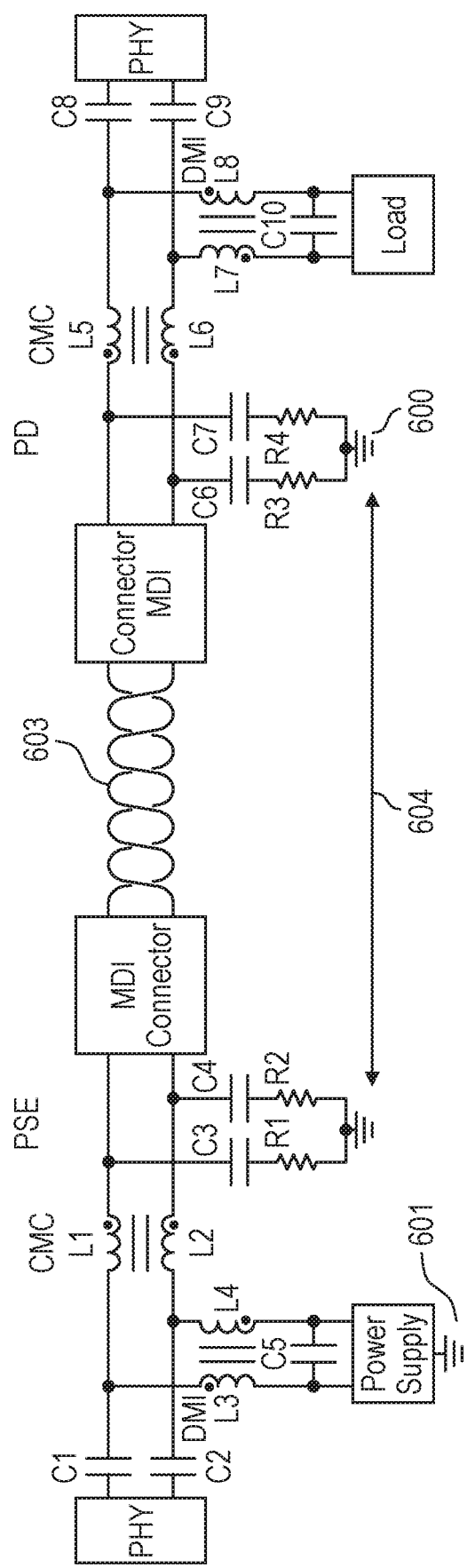
FIG. 3A illustrates a circuit example of power supply superposition in PAM communication.

FIG. 3A illustrates a circuit example of power supply superposition in PAM communication. The circuit example includes circuit PSE for superposing a power supply and circuit PD for separating the superposed power supply. In FIG. 3A, an in-vehicle camera is used as an example of the first electronic device, and an ECU is used as an example of the second electronic device for illustration. In FIG. 3A, ground line 600 of the in-vehicle camera and ground line 601 of the ECU are illustrated. In power supply superposition using PAM communication, ground line 600 of the in-vehicle camera and ground line 601 of the ECU are capable of performing transmission only by twisted pair cable 603. However, since there is no ground line with respect to irregular noise during the transmission, the noise cannot be released.

As a recommended circuit of the power supply superposition circuit, ground line 600 of the in-vehicle camera and ground line 601 of the ECU are isolated from each other as path 604 requiring the ground line isolation. What this ground line isolation means is to increase the impedance between ground line 601 of the ECU and ground line 600 of the in-vehicle camera.

Figure 3B:
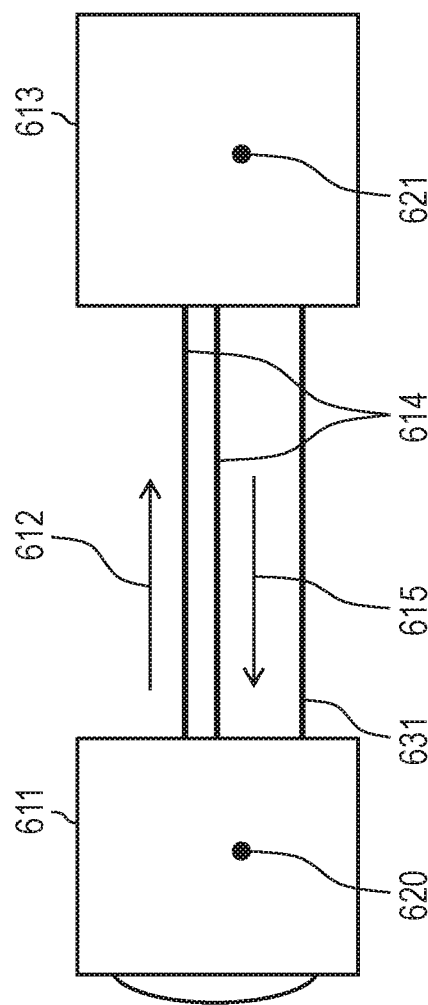
FIG. 3B illustrates an example of in-vehicle devices in a relationship between an in-vehicle camera and an electric control unit (ECU).

FIG. 3B illustrates an example of in-vehicle devices in relationships between an in-vehicle camera and an ECU. In-vehicle camera 611 and ECU 613 perform mutual communication. When seen from in-vehicle camera 611, data is transmitted to ECU 613 via twisted pair cable 614 in data transmission direction 612 of in-vehicle camera 611. The in-vehicle camera 611 and the ECU 613 are connected via a ground line 631.

Data can also be transmitted from ECU 613 to in-vehicle camera 611 in data reception direction 615 at the same timing as data transmission direction 612. In other words, data transmission direction 612 and data reception direction 615 transmit data in full-duplex communication, and a signal changes in a complicated manner in twisted pair cable 614. When power supply superposition is performed based on the circuit example illustrated in FIG. 3A, ground line 620 of the in-vehicle camera and ground line 621 of the ECU need to be isolated from each other. Therefore, when power supply superposition using PAM communication is performed, it is necessary to supply the ground line potentials to ground line 620 of the in-vehicle camera and ground line 621 of the ECU from separate systems.

Referring back to FIG. 1A to FIG. 1F, when power supply superposition using PAM communication is performed, a configuration is required where the potentials of first ground line 104 and first ground line 105 can be isolated from each other. In the present embodiment, for power supply superposition using PAM communication, in addition to twisted pair cables 106 and 107, first ground line 104 and first ground line 105 are respectively disposed in cables 121 and 122 of communication harnesses 108 and 109. Therefore, the power supply superposition function can be realized. Furthermore, even if noise is applied to twisted pair cable 106 or 107 performing differential transmission, the noise can be released because first ground line 104 and first ground line 105 are respectively disposed in cables 121 and 122.

Figure 4:
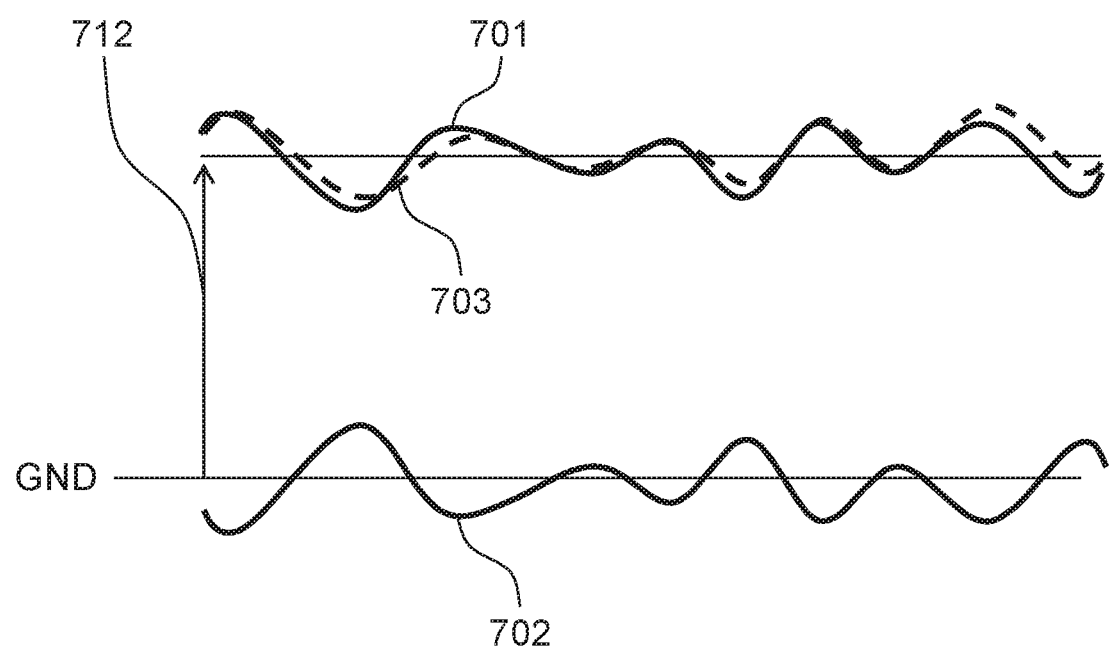
FIG. 4 illustrates an example of voltage waveforms when power supply superposition using PAM communication is performed.

FIG. 4 illustrates an example of a voltage waveform when power supply superposition using PAM communication is performed. When data is transmitted by a twisted pair cable, the positive and negative potentials of data are transmitted in differential signals which can be transmitted stably.

However, when power supply superposition is performed, a voltage to be superposed on this potential difference is added. That is, the voltage of positive waveform 701 at the time of power supply superposition is boosted by voltage 712 at the time of power supply superposition. In other words, in the data transmitted at the time of power supply superposition, the waveform of differential signal 703 for power supply superposition does not change, and the potential thereof becomes different.

Here, differential signal 703 for power supply superposition becomes the signal when data is transmitted. It is necessary to maintain the differential impedance of a first signal of positive waveform 701 at the power supply superposition and a second signal of negative waveform 702 at the power supply superposition even at the time of power supply superposition.

Referring back to FIG. 1A to FIG. 1F, when cables with the same material and the same length are used for first signal line 106a and second signal line 106b, for example, significant impedance deviation occurs in capacitance components at high frequencies.

In particular, when first signal line 106a and second signal line 106b are twisted, communication harness 108 according to the present embodiment includes first ground line 104 between first signal line 106a and second signal line 106b. Accordingly, first signal line 106a and second signal line 106b are twisted around first ground line 104. This allows the impedance of each of first signal line 106a and second signal line 106b to be kept constant. As a result, the noise to be emitted due to the impedance deviation can be suppressed.

As described above, in the present embodiment, it is possible to efficiently achieve both the noise resistance and the power supply superposition function in PAM communication.

[1-2. Advantageous Effects Etc.]

As described above, communication harness 108 according to the present embodiment performs mutual data transmission by differential transmission between at least two or more electronic devices. Communication harness 108 includes: first signal line 106a which is covered with cable 121 and through which the first signal for differential transmission is to be transmitted; and second signal line 106b which is covered with cable 121 and through which the second signal for differential transmission is to be transmitted; and first ground line 104 covered with cable 121. A supply voltage is superposed on first signal line 106a.

With this configuration, EMC resistance can be improved by arranging first ground line 104. Furthermore, since a supply voltage is superposed on first signal line 106a, the power supply superposition function is realized. Accordingly, it is possible to achieve both EMC resistance and power supply superposition function by a pair cable in communication between the electronic devices. Additionally, by arranging first ground line 104 in signal wiring with a pair cable (here, as an example, twisted pair cable 106), it is possible to increase the cable strength.

In the present embodiment, as an example, first ground line 104 is disposed between first signal line 106a and second signal line 106b, and the distance between first signal line 106a and first ground line 104 is substantially equal to the distance between second signal line 106b and first ground line 104. With this configuration, the capacitance between first signal line 106a and first ground line 104 is substantially equal to the capacitance between second signal line 106b and first ground line 104. This allows the impedance of each of signal line 106a and second signal line 106b to be kept constant. Accordingly, the noise to be emitted due to the impedance deviation can be suppressed.

Moreover, in the present embodiment, as an example, first signal line 106a and second signal line 106b are twisted around first ground line 104. With this configuration, the impedance of each of first signal line 106a and second signal line 106b can be kept constant. Accordingly, the noise to be emitted due to the impedance deviation can be suppressed.

Moreover, in the present embodiment, as an example, relay connector 102 is disposed between the electronic devices, and first signal line 106a is electrically connected to first signal line 107a of communication harness 109 via relay connector 102. Second signal line 106b is electrically connected to second signal line 107b of communication harness 109 via relay connector 102. First ground line 104 is electrically isolated from first ground line 105 of communication harness 109 by relay connector 102.

With this configuration, the potentials of first ground line 104 and first ground line 105 can be isolated from each other, and power supply superposition using PAM communication can be performed.

Relay connector 102 according to the present embodiment is disposed between first electronic device 101 and second electronic device 103, and relays a signal for differential transmission. First electronic device 101 and relay connector 102 are connected to each other via communication harness 108. Communication harness 108 includes first signal line 106a, second signal line 106b, and first ground line 104. Relay connector 102 has first terminal 111, second terminal 112, and third terminal 113. First terminal 111 is connectable to first signal line 106a. Second terminal 112 is connectable to second signal line 106b. Third terminal 113 is connectable to first ground line 104.

In contrast, second electronic device 103 and relay connector 102 are connected to each other via communication harness 109. Communication harness 109 includes first signal line 107a, second signal line 107b, and first ground line 105. Relay connector 102 has fourth terminal 114, fifth terminal 115, and sixth terminal 116. Fourth terminal 114 is connectable to first signal line 107a. Fifth terminal 115 is connectable to second signal line 107b. Sixth terminal 116 is connectable to first ground line 105.

Relay connector 102 further includes first conductive portion 117 electrically conductive to first terminal 111 and fourth terminal 114, and second conductive portion 118 electrically conductive to second terminal 112 and fifth terminal 115. Third terminal 113 and sixth terminal 116 are electrically isolated from each other. Here, "electrically isolated" corresponds to the case where the impedance is higher than a reference impedance (so-called high impedance) when there is no physical connection.

With this configuration, the ground lines of the communication harnesses are electrically isolated from each other. Accordingly, it is possible to prevent irregular noise superposed on the ground line during the transmission in one of the communication harnesses from being transmitted to the ground line of the other communication harness.

Application Example

Figure 5:
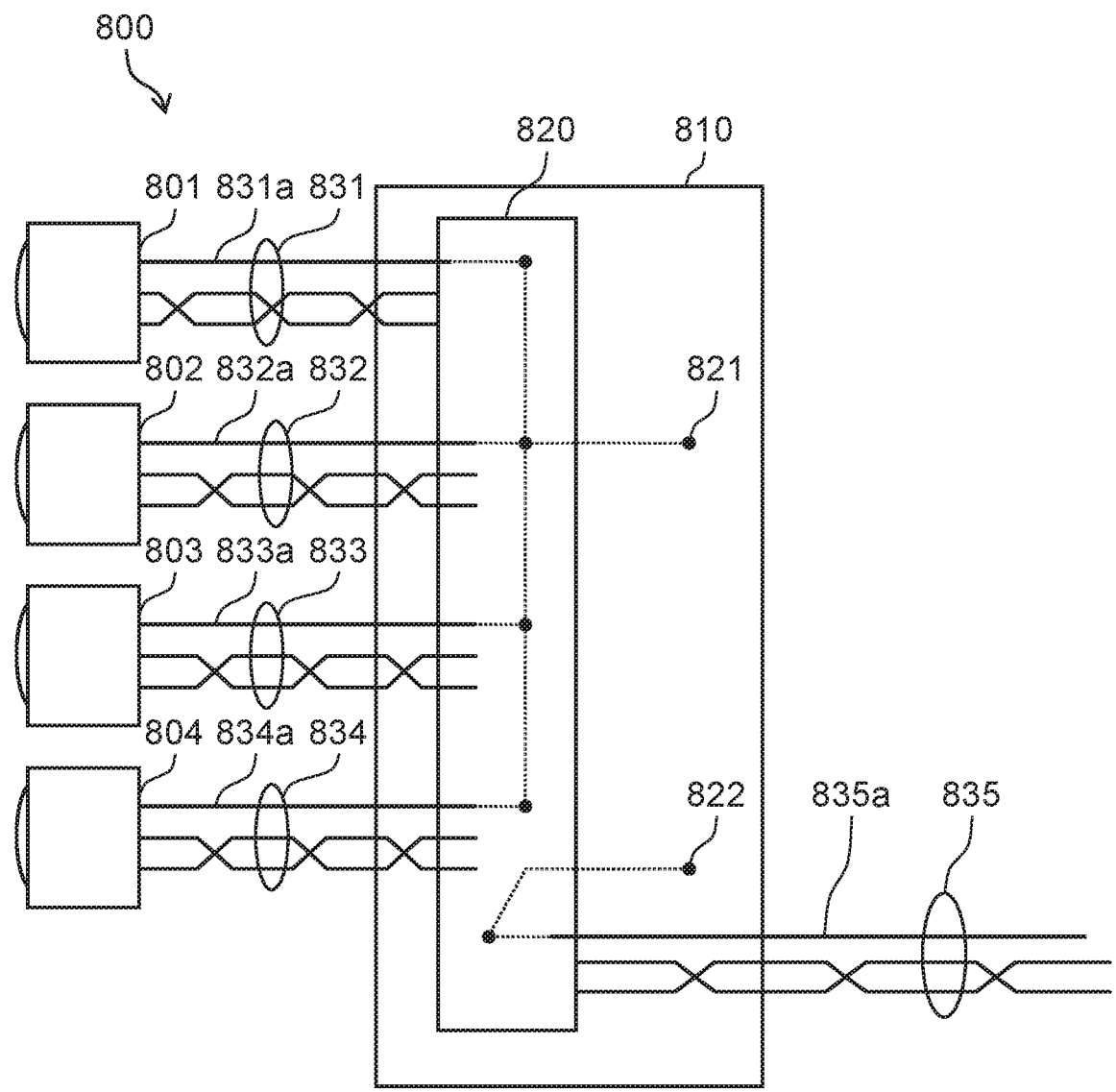
FIG. 5 illustrates a schematic configuration of an in-vehicle camera system employing the communication harnesses according to the first exemplary embodiment.

Next, an application example of the communication harnesses according to the present embodiment will be described with reference to FIG. 5. FIG. 5 illustrates a schematic configuration of an in-vehicle camera system using the communication harnesses according to the present embodiment. As illustrated in FIG. 5, in-vehicle camera system 800 includes first camera 801, second camera 802, third camera 803, fourth camera 804, and ECU 810. ECU 810 has switch 820.

First camera 801 is electrically connected to switch 820 via first communication harness 831. Second camera 802 is electrically connected to switch 820 via second communication harness 832. Third camera 803 is electrically connected to switch 820 via third communication harness 833. Fourth camera 804 is electrically connected to switch 820 via fourth communication harness 834.

Ground lines 831a to 834a of first communication harness 831 to fourth communication harness 834 are connected to first ground line 821 of ECU 810. Ground line 835a of fifth communication harness 835 is connected to second ground line 822 of ECU 810. First ground line 821 and second ground line 822 of ECU 810 are disconnected. Alternatively, first ground line 821 and second ground line 822 may not be disconnected, and may have an impedance therebetween higher than a reference impedance (so-called high impedance).

As described, ground lines 831a to 834a of first communication harness 831 to fourth communication harness 834 are electrically isolated from ground line 835a of fifth communication harness 835.

With this configuration, the potentials of ground lines 831a to 834a of first communication harness 831 to fourth communication harness 834 can be isolated from the potential of ground line 835a of fifth communication harness 835, and power supply superposition using PAM communication can be performed.

Second Exemplary Embodiment

[2-1. Configuration of Communication Harness]

Figure 6A:
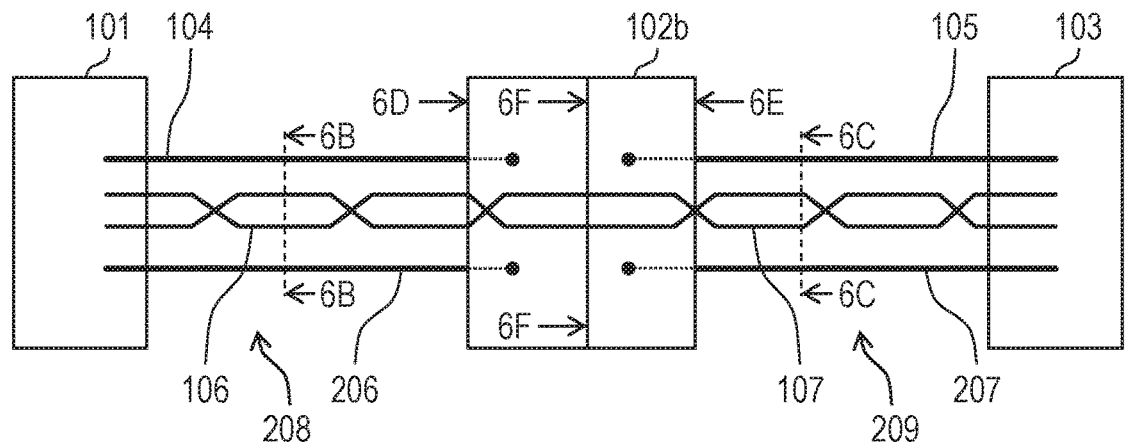
FIG. 6A schematically illustrates an electrical connection relationship between communication harnesses according to a second exemplary embodiment, the communication harnesses connecting electronic devices.
Figure 6B:
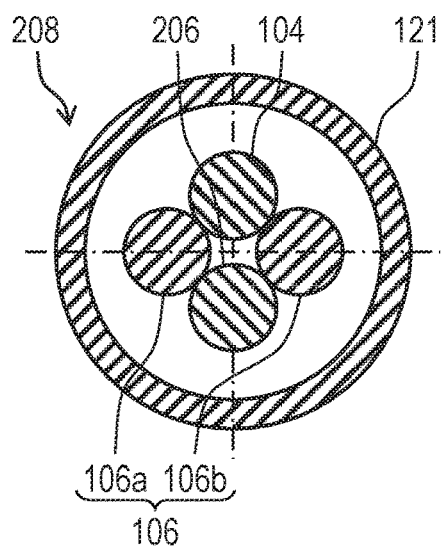
FIG. 6B is a cross-sectional view taken along line 6B-6B in FIG. 6A.
Figure 6C:
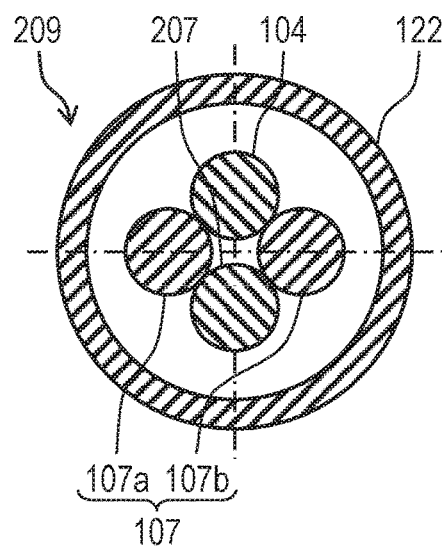
FIG. 6C is a cross-sectional view taken along line 6C-6C in FIG. 6A.
Figure 6D:
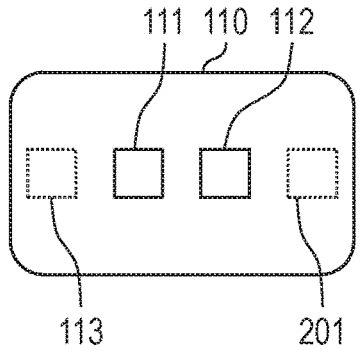
FIG. 6D is a view as seen from arrow 6D in FIG. 6A.
Figure 6E:
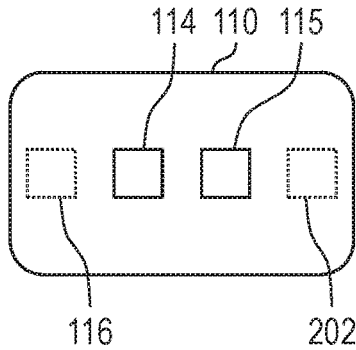
FIG. 6E is a view as seen from arrow 6E in FIG. 6A.
Figure 6F:
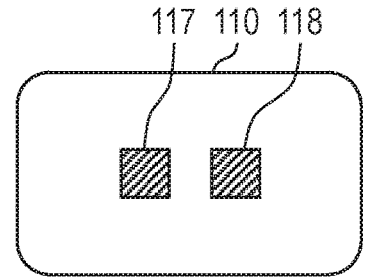
FIG. 6F is a cross-sectional view taken along line 6F-6F in FIG. 6A.

Next, communication harnesses 208 and 209 according to a second exemplary embodiment will be described. FIG. 6A schematically illustrates an electrical connection relationship between communication harnesses 208 and 209 according to the second exemplary embodiment where communication harnesses 208 and 209 connect electronic devices 101 and 103. FIG. 6B is a cross-sectional view taken along line 6B-6B in FIG. 6A. FIG. 6C is a cross-sectional view taken along line 6C-6C in FIG. 6A. FIG. 6D is a view as seen from arrow 6D in FIG. 6A. FIG. 6E is a view as seen from arrow 6E in FIG. 6A. FIG. 6F is a cross-sectional view taken along line 6F-6F in FIG. 6A. In FIG. 6A to FIG. 6F, elements corresponding to the configurations illustrated in FIG. 1A to FIG. 1F are denoted by the same reference numerals, and the description thereof will be omitted.

As illustrated in FIG. 6A to FIG. 6C, communication harness 208 according to the second exemplary embodiment is different from communication harness 108 illustrated in FIG. 1A and FIG. 1B in that communication harness 208 further includes second ground line 206. In a similar manner, communication harness 209 according to the second exemplary embodiment is different from communication harness 109 illustrated in FIG. 1A and FIG. 1C in that communication harness 209 further includes second ground line 207. This configuration substantially increases the number of ground lines, which leads to increased robustness against noise.

As illustrated in FIG. 6B, second ground line 206 is covered with cable 121. In the second exemplary embodiment, as an example, first ground line 104 and second ground line 206 are disposed to be opposite to each other, and first signal line 106a and second signal line 106b are disposed opposite to each other so as to sandwich first ground line 104 and second ground line 206.

The distance between first signal line 106a and first ground line 104 is substantially equal to the distance between second signal line 106b and second ground line 206. With this configuration, the capacitance between first signal line 106a and first ground line 104 and the capacitance between second signal line 106b and second ground line 206 can be kept constant. This makes the differential impedance constant, so that the noise to be emitted can be suppressed.

Additionally, in the second exemplary embodiment, as an example, first ground line 104, second ground line 206, first signal line 106a, and second signal line 106b are twisted. With this configuration, the capacitance between first signal line 106a and first ground line 104 and the capacitance between second signal line 106b and second ground line 206 can be further kept constant. This further makes the differential impedance constant, so that the noise to be emitted can be further suppressed.

FIG. 6D schematically illustrates relay connector 102b seen from first electronic device 101. Relay connector 102b further has seventh terminal 201 to which second ground line 206 is to be connected, as compared to relay connector 102 according to the first exemplary embodiment. First terminal 111 and second terminal 112 are disposed between third terminal 113 and seventh terminal 201.

FIG. 6E schematically illustrates relay connector 102b seen from second electronic device 103. Relay connector 102b further has eighth terminal 202 to which second ground line 207 is to be connected, as compared to relay connector 102 according to the first exemplary embodiment. Fourth terminal 114 and fifth terminal 115 are disposed between sixth terminal 116 and eighth terminal 202.

As illustrated in FIG. 6F, relay connector 102b includes first conductive portion 117 which is electrically conductive to first terminal 111 and fourth terminal 114, and second conductive portion 118 electrically conductive to second terminal 112 and fifth terminal 115. Accordingly, first conductive portion 117 is electrically conductive (connected) to first signal line 106a and first signal line 107a, and second conductive portion 118 is electrically conductive (connected) to second signal line 106b and second signal line 107b.

As described above, in relay connector 102b, twisted pair cable 106 to be connected to first electronic device 101 and twisted pair cable 107 to be connected to second electronic device 103 are connected to each other. On the other hand, first ground lines 104 and 105 are not electrically connected to each other in relay connector 102b, and second ground lines 206 and 207 are not electrically connected to each other in relay connector 102b. Alternatively, the impedance between the ground lines is higher than a reference impedance (so-called high impedance).

[3-2. Advantageous Effects Etc.]

As described above, communication harness 208 according to the second exemplary embodiment further includes second ground line 206 covered with cable 121. Such configuration substantially increases the number of ground lines, which leads to increased robustness against noise.

Moreover, the distance between first signal line 106a and first ground line 104 is substantially equal to the distance between second signal line 106b and second ground line 206. Such configuration allows the capacitance between first signal line 106a and first ground line 104 and the capacitance between second signal line 106b and second ground line 206 to be kept constant. This allows the differential impedance to be constant, so that the noise to be emitted can be suppressed.

Third Exemplary Embodiment

[3-1. Configuration of Communication Harness]

Figure 7A:
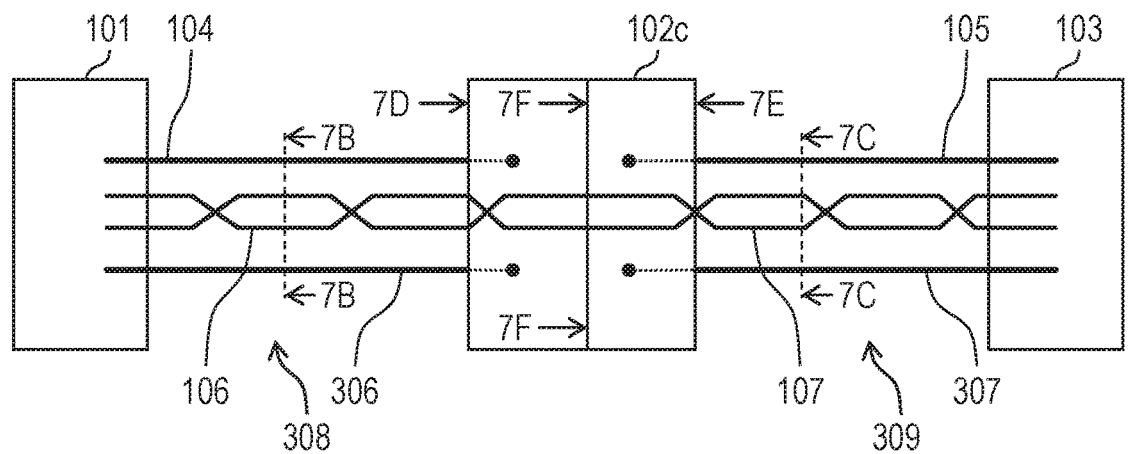
FIG. 7A schematically illustrates an electrical connection relationship between communication harnesses according to a third exemplary embodiment, the communication harnesses connecting electronic devices.
Figure 7B:
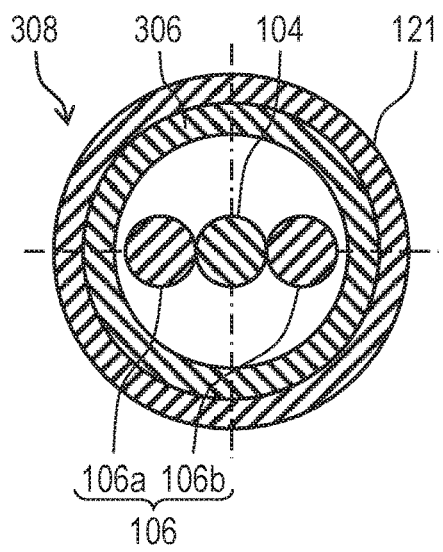
FIG. 7B is a cross-sectional view taken along line 7B-7B in FIG. 7A.
Figure 7C:
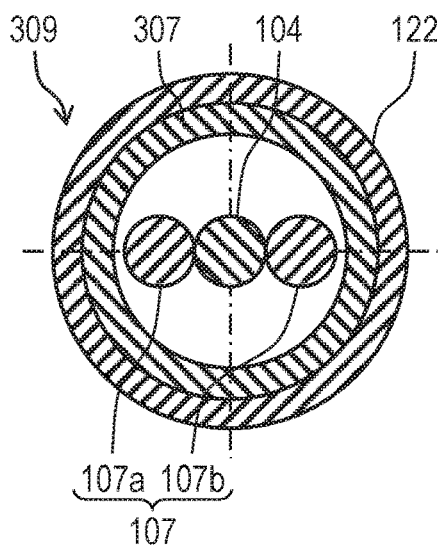
FIG. 7C is a cross-sectional view taken along line 7C-7C in FIG. 7A.
Figure 7D:
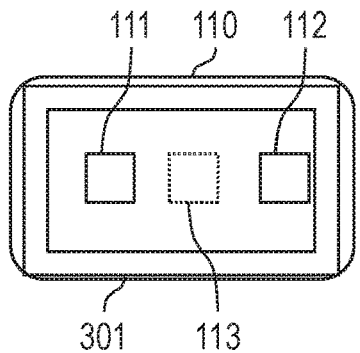
FIG. 7D is a view as seen from arrow 7D in FIG. 7A.
Figure 7E:
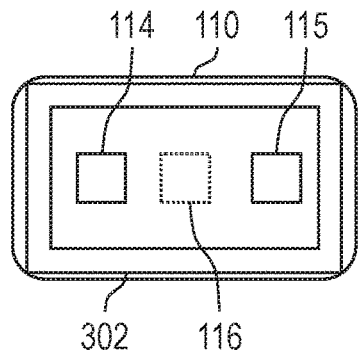
FIG. 7E is a view as seen from arrow 7E in FIG. 7A.
Figure 7F:
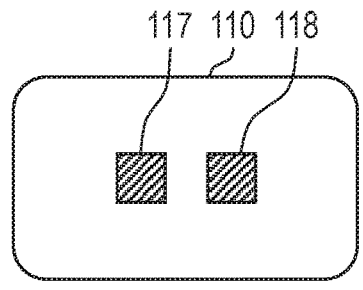
FIG. 7F is a cross-sectional view taken along line 7F-7F in FIG. 7A.

Next, communication harnesses 308 and 309 according to a third exemplary embodiment will be described. FIG. 7A schematically illustrates an electrical connection relationship between communication harnesses 308 and 309 according to the third exemplary embodiment, where communication harnesses 308 and 309 connect electronic devices 101 and 103. FIG. 7B is a cross-sectional view taken along line 7B-7B in FIG. 7A. FIG. 7C is a cross-sectional view taken along line 7C-7C in FIG. 7A. FIG. 7D is a view as seen from arrow 7D in FIG. 7A. FIG. 7E is a view as seen from arrow 7E in FIG. 7A. FIG. 7F is a cross-sectional view taken along line 7F-7F in FIG. 7A. In FIG. 7A to FIG. 7F, elements corresponding to the configurations illustrated in FIG. 1A to FIG. 1F are denoted by the same reference numerals, and the description thereof will be omitted.

As illustrated in FIG. 7A to FIG. 7C, communication harness 308 according to the third exemplary embodiment is different from communication harness 108 illustrated in FIG. 1A and FIG. 1B in that communication harness 308 further includes second ground line 306. In a similar manner, communication harness 309 according to the third exemplary embodiment is different from communication harness 109 illustrated in FIG. 1A and FIG. 1C in that communication harness 309 further includes second ground line 307. This configuration substantially increases the number of ground lines, which leads to increased robustness against noise.

In a similar manner to the first exemplary embodiment, as an example in the present embodiment, first signal line 106a and second signal line 106b are twisted around first ground line 104. This allows the impedance of each of first signal line 106a and second signal line 106b to be kept constant. Accordingly, noise to be emitted due to the impedance deviation can be suppressed.

Second ground line 306 is disposed so as to surround first signal line 106a and second signal line 106b. This configuration leads to increased robustness against noise from the outside of communication harness 308.

FIG. 7D schematically illustrates relay connector 102c seen from first electronic device 101. Relay connector 102c further has seventh terminal 301 to which second ground line 306 is to be connected, as compared to relay connector 102 according to the first exemplary embodiment. Seventh terminal 301 is disposed so as to surround third terminal 113, first terminal 111, and second terminal 112.

FIG. 7E schematically illustrates relay connector 102c seen from second electronic device 103. Relay connector 102c further has eighth terminal 302 to which second ground line 307 is to be connected, as compared to relay connector 102 according to the first exemplary embodiment. Eighth terminal 302 is disposed so as to surround sixth terminal 116, fourth terminal 114, and fifth terminal 115.

As illustrated in FIG. 7F, relay connector 102c includes first conductive portion 117 electrically conductive to first terminal 111 and fourth terminal 114, and second conductive portion 118 electrically conductive to second terminal 112 and fifth terminal 115. Accordingly, first conductive portion 117 is electrically conductive (connected) to first signal line 106a and first signal line 107a, and second conductive portion 118 is electrically conductive (connected) to second signal line 106b and second signal line 107b.

[3-2. Advantageous Effects Etc.]

As described above, communication harness 308 according to the third exemplary embodiment further includes second ground line 306 covered with cable 121. This configuration substantially increases the number of ground lines, which leads to increased robustness against noise.

Moreover, second ground line 306 is disposed so as to surround first signal line 106a and second signal line 106b. This configuration leads to increased robustness against noise from the outside of communication harness 308.

Other Exemplary Embodiments

As described above, various exemplary embodiments have been described as examples of the technique of the present disclosure. However, the technique according to the present disclosure is not limited to those, and can be applied to exemplary embodiments in which changes, replacements, additions, omissions, and the like have been made.

Hereinafter, another exemplary embodiment will be illustrated. The above exemplary embodiments have been described on the premise that each of relay connectors 102, 102b, and 102c is an individual component; however, each of relay connectors 102, 102b, and 102c may be disposed in a third electronic device. In that case, it may be that relay connector 102b is disposed in the third electronic device, for example, and that first ground line 104 included in communication harness 208 and second ground line 206 included in communication harness 208 are connected to the ground of the third electronic device.

The communication harness according to the present disclosure is resistant to EMC testing, and is capable of efficiently realizing the function of superposing power supply on a differential signal, and is suitable for an in-vehicle application and the like.

What is claimed is:

1. A communication harness set for mutual data transmission by differential transmission between at least two electronic devices via a relay connector, the communication harness set comprising:
   a first communication harness; and
   a second communication harness,
   wherein each of the first communication harness and the second communication harness includes:
   a cable;
   a first signal line which is covered with the cable, and through which a first signal for differential transmission is transmitted;
   a second signal line which is covered with the cable, and through which a second signal for differential transmission is transmitted; and a first ground line covered with the cable, wherein a supply voltage is superposed on the first signal line, the first signal line of the first communication harness is electrically connected to the first signal line of the second communication harness via the relay connector, the second signal line of the first communication harness is electrically connected to the second signal line of the second communication harness via the relay connector, and the first ground line of the first communication harness is electrically isolated from the first ground line of the second communication harness by the relay connector.

2. A relay connector which is disposed between a first electronic device and a second electronic device, and relays a signal for differential transmission, the first electronic device and the relay connector being connected to each other by a first communication harness, the second electronic device and the relay connector being connected to each other by a second communication harness, each of the first communication harness and the second communication harness including a first signal line, a second signal line, and a first ground line, the relay connector comprising:

a first terminal to be connected to the first signal line included in the first communication harness;

a second terminal to be connected to the second signal line included in the first communication harness;

a third terminal to be connected to the first ground line included in the first communication harness;

a fourth terminal to be connected to the first signal line included in the second communication harness;

a fifth terminal to be connected to the second signal line included in the second communication harness;

a sixth terminal to be connected to the first ground line included in the second communication harness and electrically isolated from the third terminal;

a first conductive portion electrically conductive connected to the first terminal and the fourth terminal; and a second conductive portion electrically conductive connected to the second terminal and the fifth terminal.

3. The relay connector according to claim 2, wherein the relay connector is disposed in a third electronic device, and the first ground line included in the first communication harness and a second ground line included in the first communication harness are connected to a ground of the third electronic device.

\* \* \* \* \*